(12) United States Patent
Li

(10) Patent No.: US 8,767,660 B2
(45) Date of Patent: Jul. 1, 2014

(54) METHOD AND SYSTEM FOR RELEASING RESOURCES AND EVOLVED NODE BASE

(75) Inventor: Bin Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 118 days.

(21) Appl. No.: 13/521,475

(22) PCT Filed: Aug. 3, 2010

(86) PCT No.: PCT/CN2010/075664
§ 371 (c)(1),
(2), (4) Date: Jul. 11, 2012

(87) PCT Pub. No.: WO2011/103737
PCT Pub. Date: Sep. 1, 2011

(65) Prior Publication Data
US 2013/0003670 A1    Jan. 3, 2013

(30) Foreign Application Priority Data

Feb. 24, 2010    (CN) .......................... 2010 1 0126498

(51) Int. Cl.
*H04W 4/00* (2009.01)
*H04B 7/00* (2006.01)
*H04W 72/04* (2009.01)
*H04L 5/14* (2006.01)
*H04W 80/04* (2009.01)

(52) U.S. Cl.
CPC ................ *H04W 72/04* (2013.01); *H04L 5/14* (2013.01); *H04W 80/04* (2013.01)
USPC .............................. 370/329; 370/331; 370/277

(58) Field of Classification Search
CPC ......... H04W 72/04; H04W 80/04; H04L 5/14
USPC .......................................................... 370/329
See application file for complete search history.

(56) References Cited

U.S. PATENT DOCUMENTS 8,503,412 B2 * 8/2013 Zhang et al. .................. 370/338
2008/0320149 A1    12/2008 Faccin
(Continued)

FOREIGN PATENT DOCUMENTS

| CN | 101369912 A | 2/2009 |
| CN | 101374342 A | 2/2009 |
| CN | 101605315 A | 12/2009 |

OTHER PUBLICATIONS

ETSI TS 136 413 v8.7.0 (Oct. 2009).*
(Continued)

*Primary Examiner* — John Blanton
*Assistant Examiner* — Abu-Sayeed Haque
(74) *Attorney, Agent, or Firm* — Henry B. Ward, III; Moore & Van Allen PLLC

(57) ABSTRACT

A method and a system for releasing resources and an evolved Node Base (eNB) are provided in the present invention, wherein the method comprises: an Evolved Packet Core (EPC) receiving a detach request from a User Equipment (UE), wherein the detach request carries a Detach Type of the UE; the EPC informing an eNB corresponding to the UE of the Detach Type; and the eNB cancelling to send a Radio Resource Control (RRC) Connection Release message to the UE in the situation that the Detach Type is switching off. The air-interface signaling and resource overhead are reduced and radio resources are saved by the present invention.

5 Claims, 6 Drawing Sheets

(56) References Cited

U.S. PATENT DOCUMENTS

| | | |
|---|---|---|
| 2009/0262736 A1 | 10/2009 | Zhao et al. |
| 2009/0296675 A1 | 12/2009 | Tenny et al. |
| 2010/0075678 A1 * | 3/2010 | Akman et al. ............... 455/436 |
| 2010/0135255 A1 | 6/2010 | Zhang et al. |

OTHER PUBLICATIONS

International Search Report; Nov. 25, 2010; Issued in International Patent Application No. PCT/CN2010/075664.

* cited by examiner

METHOD AND SYSTEM FOR RELEASING RESOURCES AND EVOLVED NODE BASE

FIELD OF THE INVENTION

The present invention relates to the communication field, and in particular to a method and a system for releasing resources and an evolved Node Base.

BACKGROUND OF THE INVENTION

In the 3rd generation mobile communication Long Term Evolution (abbreviated as LTE) system, users need to initiate a detachment process in some cases (such as switch off) so as to release the resources occupied by a User Equipment (abbreviated as UE). Hereinafter, the detachment process in the situation that the users switch off will be described in detail.

If a UE currently needs to switch off, then a detachment process for switching off is initiated, and the used message name is Detach Request (Detach Type: switch off). After the UE sent out a Detach message, which is used for switching off, and waited for a certain machine time period, the UE does not need to wait for a Detach Accept message sent from core network (Evolved Packet Core, abbreviated as EPC) and can directly release the UE context locally.

After having received the Detach Request message, the EPC judges the subsequent processing procedure according to the Detach Type. When the Detach Type is switch off, the EPC does not send the Detach Accept message to the UE, but directly sends a UE CONTEXT RELEASE COMMAND message to an evolved Node Base (abbreviated as eNB), and carries an Information Element (abbreviated as IE) cause (IE Cause) in the UE CONTEXT RELEASE COMMAND message, wherein the particular cause is Detach. When receiving the UE CONTEXT RELEASE COMMAND message, the eNB itself releases resources locally and sends a Radio Resource Control (abbreviated as RRC) Connection Release message to the UE. FIGS. 1 and 2 will be taken as examples for description hereinafter:

FIG. 1 is a schematic diagram of the flow of a Detach process for switching off when a UE is under EMM_REGISTERED state & ECM_IDLE state according to the related art. As shown in FIG. 1, a wireless link (i.e. Radio Resource Control (abbreviated as RRC) connection process is established) and a logic 51 connection are firstly established, and then the detachment process for switching off is completed.

FIG. 2 is a schematic diagram of the flow of a Detach process for switching off when a UE is under EMM_REGISTERED state & ECM_CONNECTED state according to the related art. As shown in FIG. 2, the UE directly transfers messages via an uplink Non Access Stratum (abbreviated as NAS), i.e., the uplink (abbreviated as UL) Information Transfer sends a Detach message, which is used for switching off, to the EPC and completes the Detach process for switching off.

After having received the UE CONTEXT RELEASE COMMAND (IE Cause: Detach) sent from the EPC, the eNB cannot know the particular Detach Type (i.e., switch off or normal). Therefore, the eNB needs to send an RRC Connection Release message to the UE while releasing the UE related context information locally, so as to require the UE to release the UE context.

As described above, in the situation that the Detach Type is switch off, the UE can automatically release the UE context in local after having waited for a certain machine time period. Therefore, the eNB does not need to send the RRC Connection Release message, and if the eNB still sends the RRC Connection Release message in this case, the signaling overhead will be caused to increase on the contrary and the message retransfer may be caused, and thereby precious radio resources will be wasted.

SUMMARY OF THE INVENTION

According to the present invention, a method and a system for releasing resources and an eNB are provided to solve at least one of the above problems.

According to one aspect of the present invention, a method for releasing resources is provided, comprising: an Evolved Packet Core (EPC) receiving a detach request from a User Equipment (UE), wherein the detach request carries a Detach Type of the UE; the EPC informing an evolved Node Base (eNB) corresponding to the UE of the Detach Type; and the eNB cancelling to send a Radio Resource Control (RRC) Connection Release message to the UE in the situation that the Detach Type is switch off.

Preferably, the method further comprises: the eNB sending the RRC Connection Release message to the UE in the situation that the Detach Type is normal.

Preferably, the step of the EPC informing the eNB of the Detach Type comprises: the EPC sending a UE CONTEXT RELEASE COMMAND message to the eNB, wherein the UE CONTEXT RELEASE COMMAND message carries the Detach Type.

Preferably, the UE CONTEXT RELEASE COMMAND message carries the Detach Type by the following manners: in the situation that the Detach Type is switch off, the UE CONTEXT RELEASE COMMAND message carries an Information Element Cause (IE Cause): switch off detach; and in the situation that the Detach Type is normal, the UE CONTEXT RELEASE COMMAND message carries an IE Cause: normal detach.

Preferably, the UE CONTEXT RELEASE COMMAND message carries the Detach Type by the following manners: in the situation that the Detach Type is switch off, the UE CONTEXT RELEASE COMMAND message carries an IE Cause: detach, and carries a sub-IE Detach Type: switch off; and in the situation that the Detach Type is normal, the UE CONTEXT RELEASE COMMAND message carries an IE Cause: detach, and carries a sub-IE Detach Type: normal.

According to another aspect of the present invention, a system for releasing resources is provided, comprising a UE, an eNB corresponding to the UE and an EPC, in which the UE, configured to send a detach request to the EPC via the eNB, wherein the detach request carries a Detach Type of the eNB; the EPC, configured to receive the detach request via the eNB and inform the eNB of the Detach Type; and the eNB, configured to cancel to send an RRC Connection Release message to the UE in the situation that the Detach Type is switch off.

Preferably, the eNB is further used for sending the RRC Connection Release message to the UE in the situation that the Detach Type is normal.

Preferably, the EPC comprises: a receiving module for receiving the detach request; and a sending module for sending a UE CONTEXT RELEASE COMMAND message to the eNB, wherein the UE CONTEXT RELEASE COMMAND message carries the Detach Type.

The present invention further provides an eNB, comprising: a receiving module for receiving a Detach Type of UE from an EPC; a scheduling module for, in the situation that the Detach Type is switch off, scheduling a first determining module; and the first determining module for determining not to send an RRC Connection Release message to the UE.

Preferably, the eNB further comprises: a second determining module for determining to send the RRC Connection Release message to the UE; and the scheduling module further for, in the situation that the Detach Type is normal, scheduling the second determining module.

By way of the present invention, the EPC is used to inform the eNB of the Detach Type of the UE, and the eNB determines not to send an RRC Connection Release message to the UE in the situation that the Detach Type is switch off, which solves the problem in the related art that the eNB sending the RRC Connection Release message in the situation that the Detach Type is switch off will cause the increasing of signaling overhead, and thereby the air-interface signaling and resource overhead are reduced and radio resources are saved.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will be described hereinafter in detail with reference to the drawings and in conjunction with embodiments. It needs to be noted that the embodiments of the present application and the features in the embodiments can be combined with each other if there is no conflict.

Embodiment I

Figure 1:
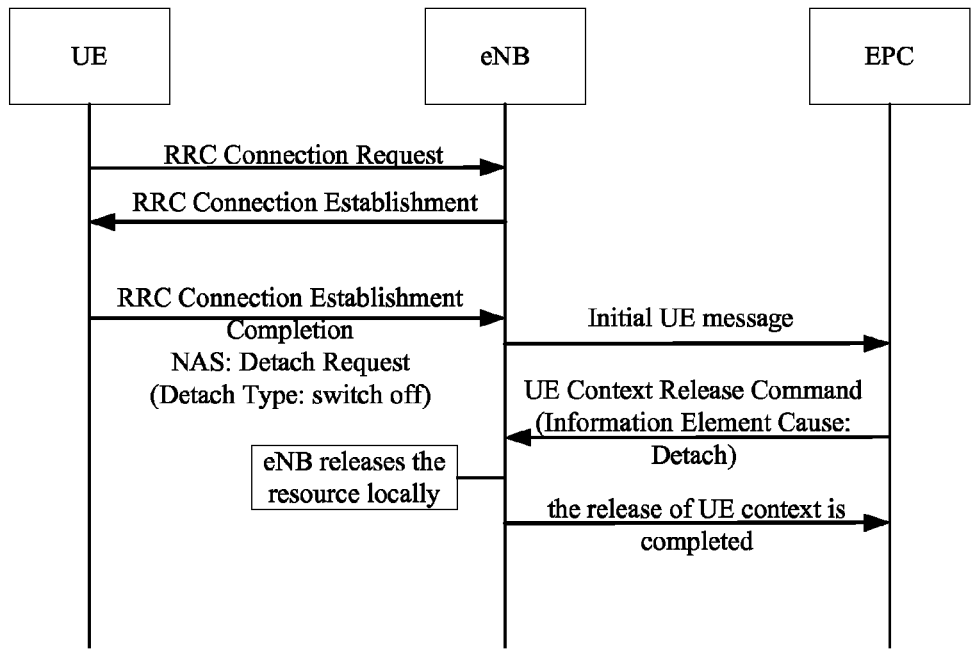
FIG. 1 is a schematic diagram of the flow of a Detach process for switching off when a UE is under EMM_REGISTERED state & ECM_IDLE state according to the related art.
Figure 2:
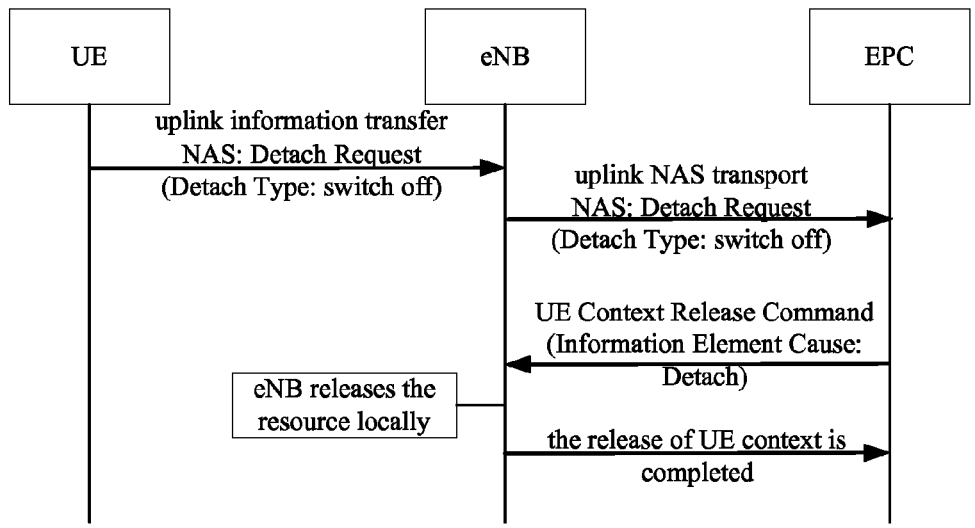
FIG. 2 is a schematic diagram of the flow of a Detach process for switching off when a UE is under EMM_REGISTERED state & ECM_CONNECTED state according to the related art.
Figure 3:
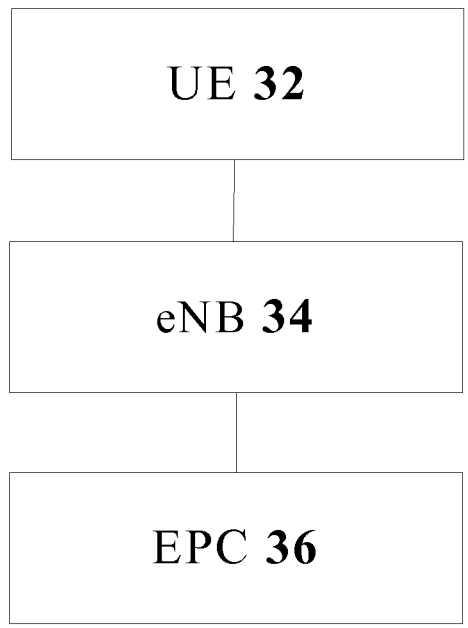
FIG. 3 is a block diagram of the structure of a system for releasing resources according to Embodiment I of the present invention.

A system for releasing resources is provided by this embodiment. FIG. 3 is a block diagram of the structure of a system for releasing resources according to Embodiment I of the present invention, and as shown in FIG. 3, the system comprises: a UE 32, an eNB 34 corresponding to the UE 32, and an EPC 36, in which:

the UE 32 is configured to send a detach request to the EPC 36 via the eNB 34, wherein the detach request carries a Detach Type of the UE 32;

the EPC 36, connected to the eNB 34, is configured to receive the detach request via the eNB 34 and informing the eNB 34 of the Detach Type; and the eNB 34, connected to the UE 32, is configured to cancel sending an RRC Connection Release message to the UE 32 in the situation that the Detach Type is switch off.

In this system, the Detach Type of the UE 32 is sent to the eNB 34 by the EPC 36, which enables the eNB 34 to determine whether the current Detach Type is switch off, and thus the RRC Connection Release message will no longer be sent to the UE 32 in the situation that the Detach Type is switch off, the air-interface signaling and resource overhead are reduced, and radio resources are saved.

Preferably, the eNB 34 is further configured to send the RRC Connection Release message to the UE 32 in the situation that the Detach Type is normal, which can reduce the air-interface signaling and resource overhead and save radio resources while ensuring that the UE 32 normally releases resources.

Figure 4:
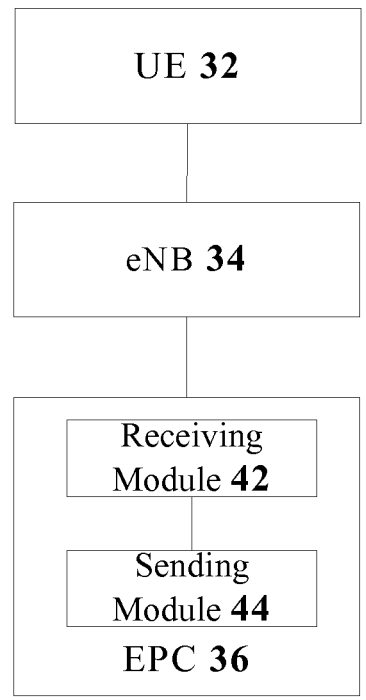
FIG. 4 is a block diagram of the detailed structure of a system for releasing resources according to Embodiment I of the present invention.

FIG. 4 is a block diagram of the detailed structure of a system for releasing resources according to Embodiment I of the present invention, and as shown in FIG. 4, the EPC 36 can particularly comprises:

a receiving module 42, configured to receive the detach request; and a sending module 44, connected to the receiving module 42, configured to send a UE CONTEXT RELEASE COMMAND message to the eNB 34, wherein this UE CONTEXT RELEASE COMMAND message carries the Detach Type.

By way of the UE CONTEXT RELEASE COMMAND message carrying the Detach Type, system resources can be saved and the running efficiency of the system can be improved.

Embodiment II

Figure 5:
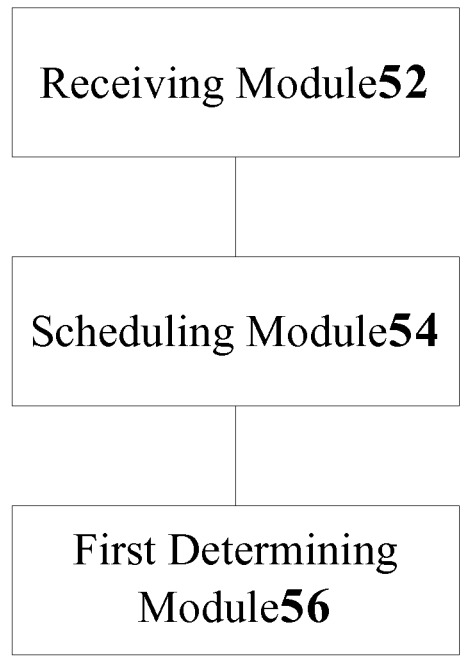
FIG. 5 is a block diagram of the structure of an eNB according to Embodiment II of the present invention.

An eNB is provided by the embodiment. FIG. 5 is a block diagram of the structure of an eNB according to Embodiment II of the present invention, and as shown in FIG. 5, this eNB can comprise:

a receiving module 52, configured to receive a Detach Type of a UE from an EPC;

a scheduling module 54, connected to the receiving module 52, configured to schedule a first determining module 56 in the situation that the Detach Type is switch off; and the first determining module 56, connected to the scheduling module 54, configured to determine not to send the RRC Connection Release message to the UE.

By way of setting the receiving module 52 to receive the Detach Type of the UE in the eNB and by way of the scheduling module 54 scheduling the first determining module 56 in the situation that the Detach Type is switch off so as to determine not send the RRC Connection Release message to the UE, the air-interface signaling and resource overhead are reduced and radio resources are saved.

Figure 6:
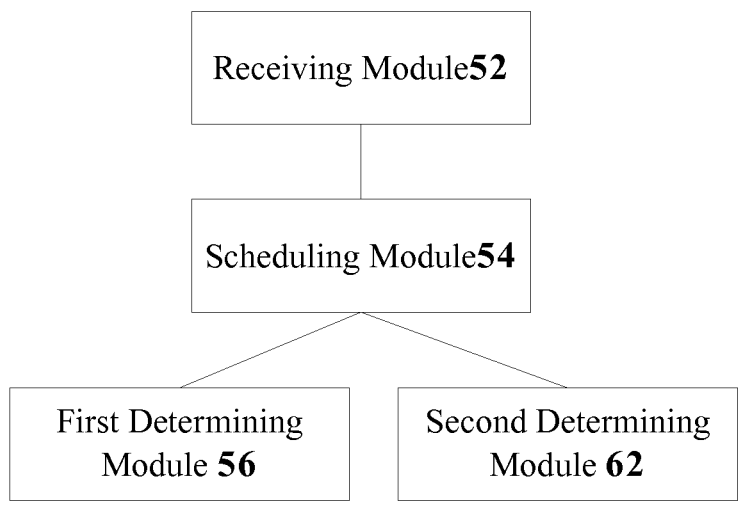
FIG. 6 is a block diagram of the detailed structure of an eNB according to Embodiment II of the present invention.

FIG. 6 is a block diagram of the detailed structure of an eNB according to Embodiment II of the present invention. As shown in FIG. 6, preferably, the eNB further comprises: a second determining module 62, connected to the scheduling module 54, configured to determine to send the RRC Connection Release message to the UE; and the above scheduling module 54 is further configured to schedule the second determining module 62 in the situation that the Detach Type is normal. By way of setting the scheduling module 54 to schedule the second determining module 62 in the situation that the Detach Type is normal so as to send an RRC Connection Release message to the UE, the air-interface signaling and resource overhead can be reduced and radio resources can be saved while ensuring that the UE normally releases resources.

Embodiment III

Figure 7:
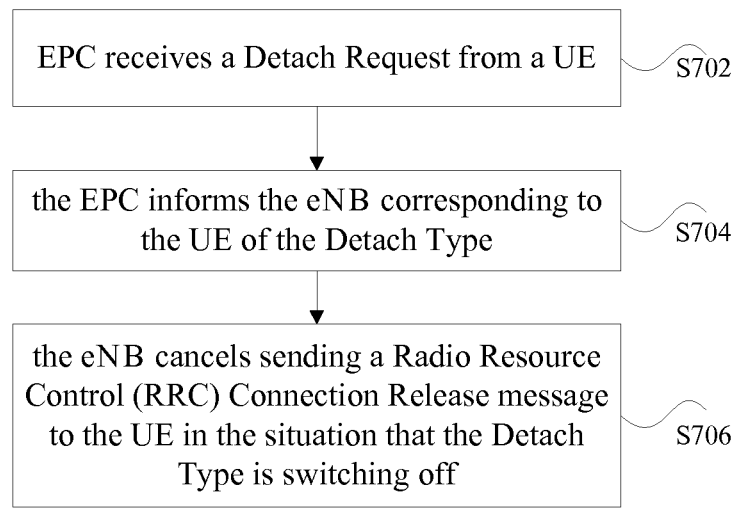
FIG. 7 is a flow chart of a method for releasing resources according to Embodiment III of the present invention.

A method for releasing resources is provided by the embodiment. FIG. 7 is a flow chart of a method for releasing resources according to Embodiment III of the present invention, and as shown in FIG. 7, the method comprises the steps as follows.

Step S702: an Evolved Packet Core (EPC) receives a detach request from a UE, wherein the detach request carries a Detach Type of the UE;

Step S704: the EPC informs an eNB corresponding to the UE of the Detach Type; and Step S706: the eNB cancels sending a Radio Resource Control (RRC) Connection Release message to the UE in the situation that the Detach Type is switch off.

In the above method, the Detach Type of the UE is informed to the eNB by the EPC, which enables the eNB to know the current Detach Type of the UE, and thus the RRC Connection Release message will no longer be sent to the UE in the situation that the Detach Type is switch off. This method is capable of solving the problem in the related art that the eNB sending an RRC Connection Release message, in the situation that the Detach Type is switch off, causes the increasing of signaling overhead without changing the detachment procedure at the UE side, and thereby the air-interface signaling and resource overhead are reduced and radio resources are saved.

Figure 8:
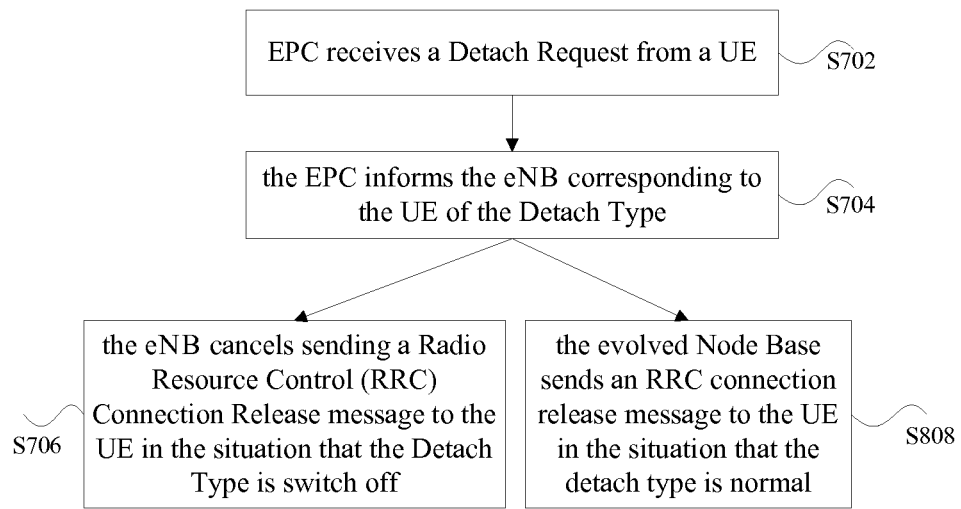
FIG. 8 is a detailed flow chart of a method for releasing resources according to Embodiment III of the present invention.

FIG. 8 is a detailed flow chart of a method for releasing resources according to Embodiment III of the present invention. As shown in FIG. 8, preferably, the method can further comprises the steps as follows.

Step S808: the eNB sends an RRC Connection Release message to a UE in the situation that the Detach Type is normal.

The method specifies that the eNB sends the RRC Connection Release message to the UE in the situation that the Detach Type is normal, which can reduce the air-interface signaling and resource overhead and save radio resources while ensuring that the UE normally releases resources.

Preferably, in the step S808, the EPC informing the eNB of the Detach Type comprises: the EPC sending a UE CONTEXT RELEASE COMMAND message to the eNB, wherein the UE CONTEXT RELEASE COMMAND message carries the Detach Type. By way of the UE CONTEXT RELEASE COMMAND message carrying the Detach Type, system resources can be saved and the running efficiency of the system can be improved.

It needs to be noted that using a UE CONTEXT RELEASE COMMAND message to carry the Detach Type is only a preferred implementation, and the Detach Type can be carried in other currently available messages, or new message types and formats can be specified to carry the Detach Type.

Preferably, the UE CONTEXT RELEASE COMMAND message can carry the Detach Type by one of the manners as follows.

Manner I

In the situation that the Detach Type is switch off, the UE CONTEXT RELEASE COMMAND message carries an information element cause (IE Cause): switch off detach.

In the situation that the Detach Type is normal, the UE CONTEXT RELEASE COMMAND message carries an IE Cause: normal detach.

Manner II

In the situation that the Detach Type is switch off, the UE CONTEXT RELEASE COMMAND message carries an IE Cause: detach, and carries a sub-IE Detach Type: switch off.

In the situation that the Detach Type is normal, the UE CONTEXT RELEASE COMMAND message carries an IE Cause: detach, and carries a sub-IE Detach Type: normal.

It needs to be noted that the Detach Type can be carried in the UE CONTEXT RELEASE COMMAND by other manners, such as the manner of carrying a pre-specified type code in the UE CONTEXT RELEASE COMMAND and so on, as long as the Detach Type of the UE can be indicated.

Embodiment VI

Figure 9:
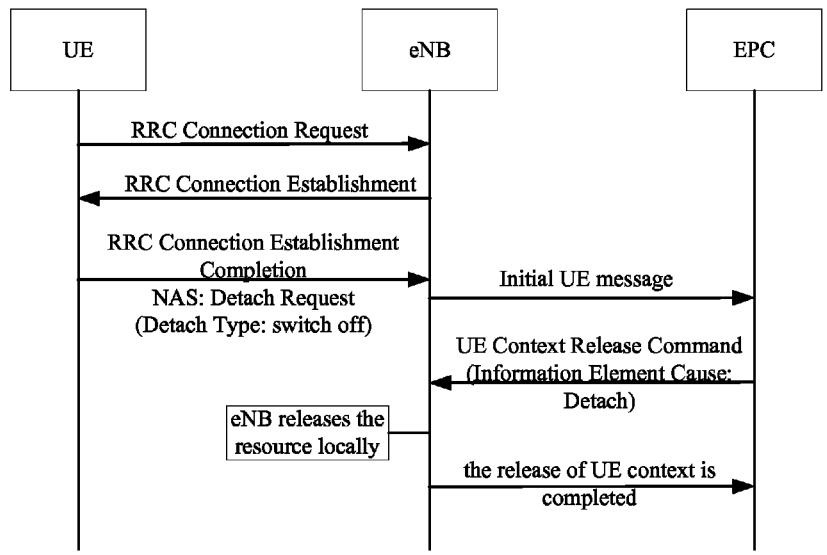
FIG. 9 is a schematic diagram of the flow of a Detach process for switching off when a UE is under EMM_REGISTERED state & ECM_IDLE state according to Embodiment IV of the present invention.

FIG. 9 is a schematic diagram of the flow of a Detach process for switching off when a UE is under EMM_REGISTERED state & ECM_IDLE state according to Embodiment IV of the present invention. The embodiment will be combined with FIG. 9 to describe the detailed processing procedure of the method for releasing resources provided by the embodiment in the situation that the UE is under EMM_REGISTERED state & ECM_IDLE state.

The UE is under EMM_REGISTERED state & ECM_IDLE state, and the UE initiates a Detach process (including two types of Detach processes: switch off detach and normal detach). As to the Detach Type: switch off, the UE releases the UE context locally after having sent out a Detach Request message, or releases the UE context after having waited for a certain machine time period. As to the Detach Type: normal detach, the UE needs to wait for a Detach Accept message and then releases the UE context after having sent out the Detach Request. The UE firstly carries out uplink synchronization via a random access process, and establishes a wireless link (RRC connection establishment process) and a logic Si connection.

After having received the Detach Request message, the EPC judges the subsequent processing procedure according to the Detach Type:

(1) if the Detach Type is switch off, the EPC would not send the Detach Accept message to the UE, but directly send a UE CONTEXT RELEASE COMMAND message to the eNB, wherein this UE CONTEXT RELEASE COMMAND message carries an IE cause: switch off detach; or this UE CONTEXT RELEASE COMMAND message carries an IE cause: Detach and is added with a sub-IE Detach Type (including: switch off, normal detach, and herein it is switch off).

(2) If the Detach Type is normal detach, the EPC sends the Detach Accept message to the UE and sends a UE CONTEXT RELEASE COMMAND message to the eNB, wherein this UE CONTEXT RELEASE COMMAND message carries an IE cause: normal detach; or this UE CONTEXT RELEASE COMMAND message carries an IE cause: Detach and is added with a sub-IE Detach Type (including: switch off, normal detach, and herein it is normal detach).

After having received the UE CONTEXT RELEASE COMMAND message sent by the EPC, the eNB carries out the subsequent processing procedure according to the Detach Type in the IE cause. If this UE CONTEXT RELEASE COMMAND message carries the IE cause: switch off detach, or this message carries the IE cause: Detach and is added with the sub-IE Detach Type: switch off, then as shown in FIG. 9, the eNB releases the UE context information locally and does not need to send an RRC Connection Release message to the UE; if the UE CONTEXT RELEASE COMMAND message carries the IE cause: normal detach, or the UE CONTEXT RELEASE COMMAND message carries the IE cause: Detach and is added with the sub-IE Detach Type: normal detach, then the eNB releases the UE context information locally and sends an RRC Connection Release message to the UE to request the UE to release the UE context.

Embodiment 2

Figure 10:
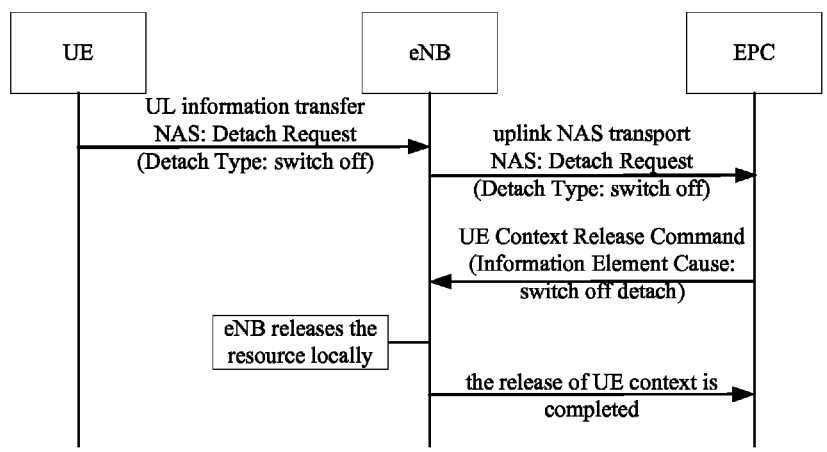
FIG. 10 is a schematic diagram of the flow of a Detach process for switching off when a UE is under EMM_REGISTERED state & ECM_CONNECTED state according to Embodiment V of the present invention.

FIG. 10 is a schematic diagram of the flow of a Detach process for switching off when a UE is under EMM_REGISTERED state & ECM_CONNECTED state according to Embodiment V of the present invention. The embodiment will be combined with FIG. 10 to describe the detail processing procedure of the method for releasing resources provided by the embodiment under the situation that the UE is under EMM_REGISTERED state & ECM_CONNECTED state.

The UE is under EMM_REGISTERED state & ECM_IDLE state, and the UE initiates a Detach process (including: two types of Detach processes: switch off detach and normal detach). As to the Detach Type: switch off, the UE releases the UE context locally after having sent out a Detach Request message, or releases the UE context after having waited for a certain machine time period. As to the Detach Type: normal detach, the UE needs to wait for a Detach Accept message and then releases the UE context after having sent out the Detach Request. The UE firstly sends a Detach message, which is used for switching off, to the EPC via an uplink (UL) NAS (Non Access Stratum) Information Transfer and completes the Detach process for switching off. The process of the UE sending the Detach message, which is used for switching off, to the EPC can comprise: the UE informing the eNB of the Detach Request via the UL Information Transfer message and then the eNB informing the EPC of the Detach Request via an UPLINK NAS TRANSPORT message.

After having received the Detach Request message, the EPC judges the subsequent processing procedure according to the Detach Type:

(1) if the Detach Type is switch off, the EPC would not send the Detach Accept message to the UE, but directly send a UE CONTEXT RELEASE COMMAND message to the eNB, wherein this UE CONTEXT RELEASE COMMAND message carries an IE cause: switch off detach; or this UE CONTEXT RELEASE COMMAND message carries an IE cause: Detach and is added with a sub-IE Detach Type (including: switch off, normal detach, and herein it is switching off).

(2) If the Detach Type is normal detach, the EPC sends the Detach Accept message to the UE and sends a UE CONTEXT RELEASE COMMAND message to the eNB, wherein the UE CONTEXT RELEASE COMMAND message carries an IE cause: normal detach; or the UE CONTEXT RELEASE COMMAND message carries an IE cause: Detach and is added with a sub-IE Detach Type (including: switch off, normal detach, and herein it is normal detach).

After having received the UE CONTEXT RELEASE COMMAND message sent by the EPC, the eNB carries out the subsequent processing procedure according to the Detach Type in the IE cause. If this UE CONTEXT RELEASE COMMAND message carries the IE cause: switch off detach, or this message carries the IE cause: Detach and is added with the sub-IE Detach Type: switch off, then as shown in FIG. 10, the eNB releases the UE context information locally and does not need to send an RRC Connection Release message to the UE; if the UE CONTEXT RELEASE COMMAND message carries the IE cause: normal detach, or the UE CONTEXT RELEASE COMMAND message carries the IE cause: Detach and is added with the sub-IE Detach Type: normal detach, then the eNB releases the UE context information locally and sends an RRC Connection Release message to the UE to request the UE to release the UE context.

In summary, the method for releasing resources provided by the embodiments of the present invention solves the problem in the related art that the eNB sends an RRC Connection Release message in the situation that the Detach Type is switch off so as to cause the increasing of signaling overhead, and thereby the air-interface signaling and resource overhead are reduced and radio resources are saved.

Obviously, those skilled in the art should understand that the above modules or steps of the present invention can be implemented by using a general-purpose computing apparatus, can be integrated in a single computing apparatus or distributed on a network which consists of multiple computing apparatus. Optionally, the modules and the steps of the present invention can be implemented by using executable program code of the calculating device. Consequently, they can be stored in a storage for being executed by the computing apparatus, and in some cases, the shown or described steps can be performed in an order different from the order here, or they can be made into various integrated circuit modules respectively, or some modules or steps therein are made into a single integrated circuit module for implementation. In this way, the present invention is not limited to any particular hardware and software combination.

What are described above are only preferred embodiments of the present invention but not to limit the present invention. The present invention can have various modifications and alternations to those skilled in the art. Any amendments, equivalent replacements, improvements, etc. within the spirit and principle of the present invention are all fall into the protection scope of the present invention.

What is claimed is:

1. A method for releasing resources, comprising:
an Evolved Packet Core (EPC) receiving a detach request from a User Equipment (UE), wherein the detach request carries a Detach Type of the UE; the EPC informing an evolved Node Base (eNB) corresponding to the UE of the Detach Type, wherein the EPC sends a UE CONTEXT RELEASE COMMAND message to the eNB, and wherein the UE CONTEXT RELEASE COMMAND message carries the Detach Type by the following manners: in the situation that the Detach Type is switch off, the UE CONTEXT RELEASE COMMAND message carries (i) an Information Element Cause (IE Cause): switch off detach or (ii) an IE Cause: detach, and carries a sub-IE Detach Type: switch off; in the situation that the Detach Type is normal, the UE CONTEXT RELEASE COMMAND message carries (i) an IE Cause: normal detach, or (ii) an IE Cause: detach, and sub-IE Detach Type: normal; and the eNB cancelling to send a Radio Resource Control (RRC) Connection Release message to the UE in the situation that the Detach Type is switch off; and the eNB sending the RRC Connection Release message to the UE in the situation that the Detach Type is normal.

2. A system for releasing resources, comprising a UE, an eNB corresponding to the UE and an EPC, wherein the UE, configured to send a detach request to the EPC via the eNB, wherein the detach request carries a Detach Type of the eNB;

the EPC, configured to receive the detach request via the eNB and inform the eNB of the Detach Type, wherein the EPC comprises a receiving module and a sending module stored on a non-transitory computer-readable medium, wherein the receiving module is configured to receive the detach request and wherein the sending module is configured to send a UE CONTEXT RELEASE COMMAND message to the eNB, wherein the UE CONTEXT RELEASE COMMAND message carries the Detach Type by the following manners: in the situation that the Detach Type is switch off, the UE CONTEXT RELEASE COMMAND message carries an Information Element Cause (IE Cause): switch off detach; and in the situation that the Detach Type is normal, the UE CONTEXT RELEASE COMMAND message carries an IE Cause: normal detach; and the eNB, configured to cancel sending an RRC Connection Release message to the UE in the situation that the Detach Type is switch off.

3. the system according to claim 2, wherein the eNB is further configured to send the RRC Connection Release message to the UE in the situation that the Detach Type is normal.

4. An evolved Node Base (eNB), comprising: a receiving module stored on a non-transitory computer-readable medium, the receiving module configured to receive a Detach Type of a UE from an EPC, wherein the EPC comprises a receiving module and a sending module stored on a non-transitory computer-readable medium, wherein the receiving module is configured to receive the detach request, and wherein the sending module is configured to send a UE CONTEXT RELEASE COMMAND message to the eNB, wherein the UE CONTEXT RELEASE COMMAND message carries the Detach Type by the following manners: in the situation that the Detach Type is switch off, the UE CONTEXT RELEASE COMMAND message carries an Information Element Cause (IE Cause): switch off detach; and in the situation that the Detach Type is normal, the UE CONTEXT RELEASE COMMAND message carries an IE Cause: normal detach; a scheduling module stored on a non-transitory computer-readable medium, configured to schedule a first determining module stored on a non-transitory computer-readable medium in the situation that the Detach Type is switching off; and the first determining module, configured to determine not to send an RRC Connection Release message to the UE.

5. The eNB according to claim 4, wherein the eNB further comprises: a second determining module stored on a non-transitory computer-readable medium, configured to determine to send the RRC Connection Release message to the UE; and the scheduling module, further configured to schedule the second determining module in the situation that the Detach Type is normal.

\* \* \* \* \*